April 17, 1945. V. E. SPROUSE 2,374,141
HOSE CLAMP
Filed Dec. 16, 1943 2 Sheets-Sheet 1

INVENTOR,
Verner E. Sprouse,
By Herbert A. Minturn,
Attorney.

April 17, 1945.  V. E. SPROUSE  2,374,141
HOSE CLAMP
Filed Dec. 16, 1943  2 Sheets-Sheet 2

INVENTOR,
VERNER E. SPROUSE,
By Herbert A. Minturn,
ATTORNEY.

Patented Apr. 17, 1945

2,374,141

UNITED STATES PATENT OFFICE 2,374,141

HOSE CLAMP

Verner E. Sprouse, Columbus, Ind.

Application December 16, 1943, Serial No. 514,501

5 Claims. (Cl. 24—19)

This invention relates to a hose clamp of that type wherein there is a band for completely encircling the hose to have one end thereof extend in part at least through a slot in the band to have that end engaged by a member partially encircling the outer side of the band and terminating in an ear opposing a like ear on the end of the band whereby the two ears may be pulled one toward the other to apply tension on the encircling band and reduce its effective internal diameter to effect the clamping action.

A primary object of the present invention is to provide an interengaging structure between the end of the band and the outer engaging member whereby that end and the engaging member tend to be drawn one against the other in the clamping action so as to prevent that end from digging or gouging into the encircled hose.

Figure 2:
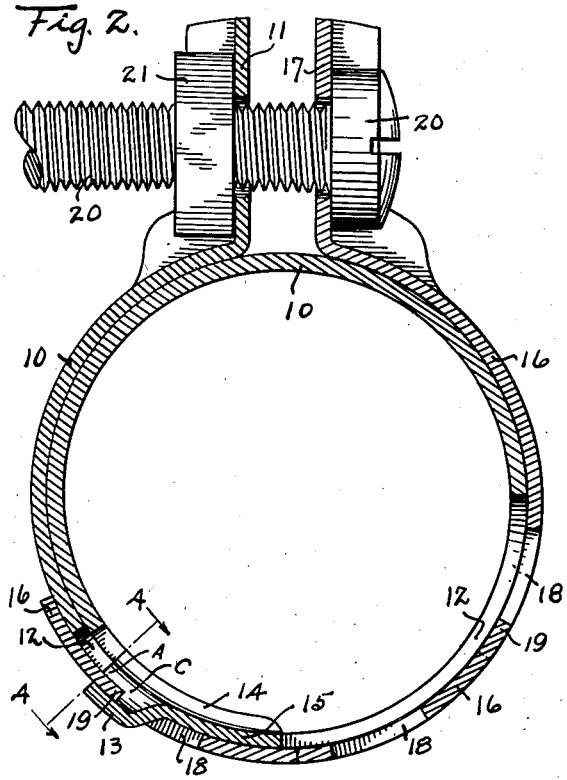
Figure 1:
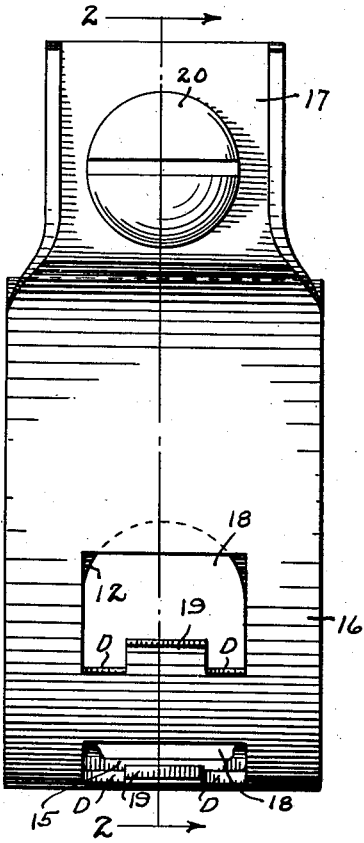
Figure 3:
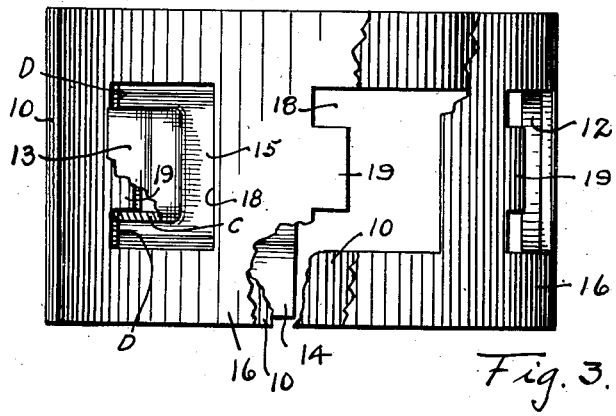
Figure 4:
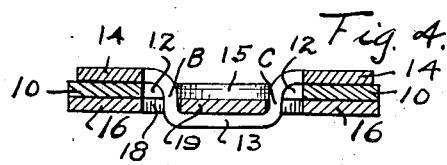
Figure 5:
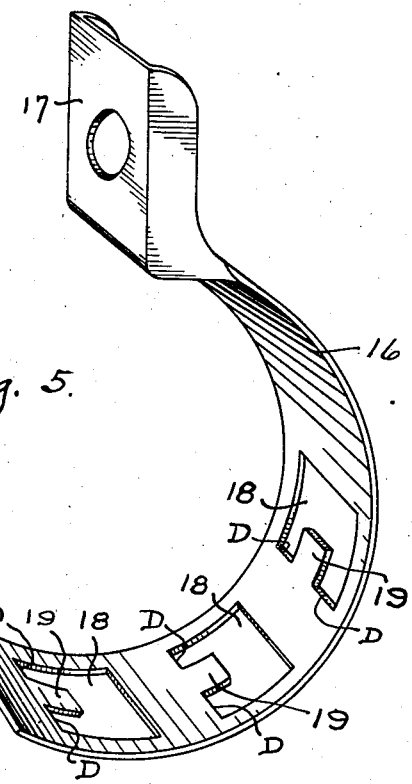

A further primary object of the invention is to provide a structure which will have positive engaging or interlocking members so designed that those members are not subjected to bending stress in such manner that they will tend to open up and be released one from the other. Other important objects and advantages of the invention reside in the new and unique associations of the various elements as more specifically set forth in the appended claims and as will become more apparent to those versed in the art in the description of one particular form of the invention as illustrated in the accompanying drawings, in which Fig. 1 is a side view of a structure embodying the invention;

Fig. 2, a view in section on the line 2—2 in Fig. 1;

Fig. 3, a bottom plan view with some parts being in partial section;

Fig. 4, a view in section on the line 4—4 in Fig. 2;

Fig. 5, a view in perspective of the clamp member; and

Figure 6:
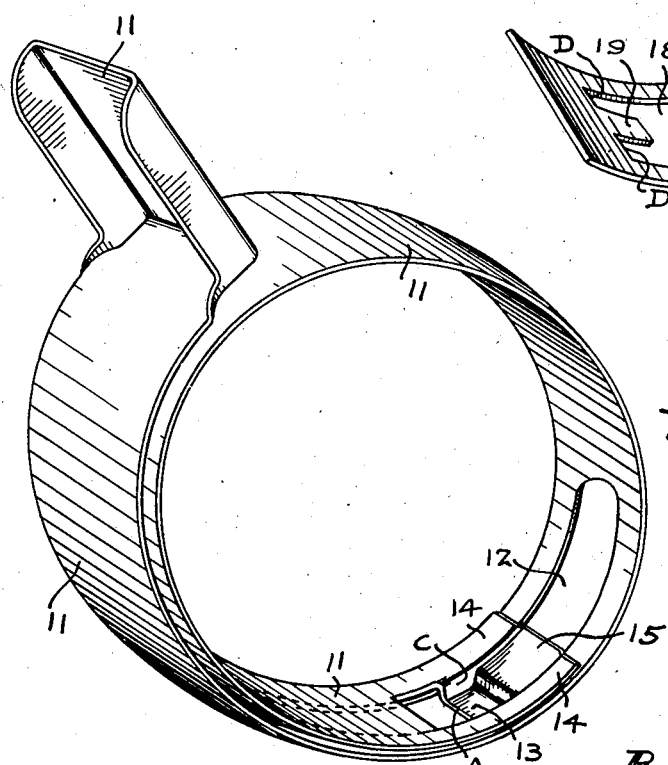

Fig. 6, a view in perspective of the clamp band.

Like characters of reference indicate like parts throughout the several views in the drawings.

A clamp band, generally designated by the numeral 10, is formed out of any desired flexible metal to have the required width and length for that size of hose to be clamped. On one end of this band 10 is formed an ear 11 to extend angularly therefrom, as indicated in Fig. 2. The band 10 from the base of the ear 11 is bent around into circular form to form a complete circle and have its terminal portion wrap around against the inner face for a substantial distance, herein shown as approximately 180 degrees, this degree of lapping depending, of course, upon how much the clamp is drawn up from its initial shape. A portion of the band 10 is provided with a central longitudinal slot 12 and the terminal end of the band 10, which overlaps the inner face of the band, extends along this slot 12 initially for a short distance to have an outwardly pressed portion 13 extend through the slot 12. This portion 13 is shaped in the nature of a hood to have an opening A therein from that side directed around toward the ear 11.

On each side of the hood 13 the band terminal portion, generally designated by the numeral 14, extends along the band 10 in overlapping relation on each side of the slot 12, and between these overlapping side portions there is the depressed length 15, the outer face of which is flush with the outer face of the band 10. The hooded portion 13, in the present form of the invention, is formed by pressing an end of the length 15 outwardly and centrally of the end 14 to have a width which will be clear of the side edges of the slot 12 so that this hooded portion 13 may travel freely around through the slot 12. This hooded portion 13 has sides B and C integrally formed with the end 14, as best indicated in Fig. 4.

A clamp member, generally designated by the numeral 16, is formed to have an ear 17 turned outwardly from one end to be of the same size and shape as the ear 11. From this ear 17, the member 16 is curved around into arcuate form to correspond to the curvature of the band 10 so that the member 16 may fit snugly against the outer face of the band 10 on the side opposite the overlapping of the band 10 within itself. This member 16 is preferably made out of a flexible metal, such as the metal used in making the band 10, so that the member 16 may conform to the changing diameter of the band 10 during the clamping operation.

The member 16 is provided with a sufficient circumferential length from the base of the ear 17 when it is positioned on the band 10, as indicated in Fig. 2, to carry the other free end around past the hood 13. This member 16 is provided preferably with a number of windows 18 or openings therethrough, each having a transverse width equal at least to the transverse opening through the slot 12. The transverse edge of each window 18 on that side thereof toward the ear 17 is, in the present showing, a straight line but from the opposite edge there is provided a circumferentially extending tongue 19 centrally positioned and having a width permitting it to be inserted into the opening A of the hood 13. The length of the tongue 19 in each instance is such that the edge portion of the window 18 on each side of the tongue may be brought into abutment with the marginal edge of the side walls of the hood 13, as indicated in Fig. 3. Furthermore, the width of the tongue 19 is made to be such that it will fit snugly within the hood 13 so as to hold the member 16 against any appreciable lateral movement across the encircled part of the band 10.

The purpose of providing a plurality of windows 18 is to afford an adjustable feature wherein the one clamp may be employed for a considerable take-up. That is, when the first appearing window 18 is employed to receive the hood 13 therethrough, as indicated in Fig. 2, the clamp bolt 20, which extends through the ears 17 and 11 to have a nut 21 engage thereon and in abutment with the outer side of the ear 11, is drawn up until the ears 17 and 11 approach one another with but slight clearance therebetween, following which the bolt 20 may be turned to permit the member 16 to be shifted back around the outside of the band 10 to have the hooded portion 13 come through the second appearing window 18 and permit the tongue 19 in that window to be inserted within the hood 13. Thereupon the bolt 20 may again be tightened to effect a further clamping action with the corresponding reduction of internal diameter of the encircling band 10.

Since the outer part of the hood 13 is tied by its side walls B and C to the portions of the end 14 which overlap the inner faces of the band 10 appearing on each side of the slot 12, the hooded portion 13 cannot bend outwardly out of engagement with the tongue 19 and neither can the tongue 19 bend outwardly. Furthermore positive abutment is afforded between the member 16 and the end 14 by reason of the side walls B and C of the hood 13 bearing against the transverse edge D of the window 18 appearing on each side of the tongue 19. Again the normal tendency of the end 14 to bend inwardly or outwardly is prevented by reason of the overlapping portions bearing against the inner faces of the band portion 10 and by reason of the depressed part of the end 14 within the slot 12 being in frictional contact with the inner face of the member 16 between adjacent windows 18. The tongue 19, fitting within the hood 13, prevents inward bending of the end 14 so as to keep that end from gouging into the encircled hose.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. A hose clamp comprising in combination a flexible band; an outturned ear on the band; said band being circularly curved outwardly and around downwardly from said ear and thence upwardly and around to wrap within itself in overlapping relation to form a closed circle; said band having a longitudinal slot therethrough; a free end portion of said band overlapping said slot from the inner face of the band; a hood on said end portion entering said slot and having a transverse opening thereinto on the end side directed toward said ear; a flexible band closing member curved to fit around the outside of said band; an ear on said band closing member; said closing member having at least one window therethrough; and a tongue extending from that edge of said window directed toward said ear end of the closing member to enter said hood opening; whereby pulling said closing member ear toward said band ear will cause said tongue to engage within said hood to pull said band end portion around the band to reduce the internal diameter of the band.

2. A hose clamp comprising in combination a flexible band; an outturned ear on the band; said band being circularly curved outwardly and around downwardly from said ear and thence upwardly and around to wrap within itself in overlapping relation to form a closed circle; said band having a longitudinal slot therethrough; a free end portion of said band overlapping said slot from the inner face of the band; a hood on said end portion entering said slot and having a transverse opening thereinto on the end side directed toward said ear; a flexible band closing member curved to fit around the outside of said band; an ear on said band closing member; said closing member having at least one window therethrough; and a tongue extending from that edge of said window directed toward said ear end of the closing member to enter said hood opening; whereby pulling said closing member ear toward said band ear will cause said tongue to engage within said hood to pull said band end portion around the band to reduce the internal diameter of the band; said tongue width being less than the width of said window to have said window edge at each side of the tongue abut said hood to transfer pressure thereto from said band closing member.

3. A hose clamp comprising in combination a flexible band; an outturned ear on the band; said band being circularly curved outwardly and around downwardly from said ear and thence upwardly and around to wrap within itself in overlapping relation to form a closed circle; said band having a longitudinal slot therethrough; a free end portion of said band overlapping said slot from the inner face of the band; a hood on said end portion entering said slot and having a transverse opening thereinto on the end side directed toward said ear; a flexible band closing member curved to fit around the outside of said band; an ear on said band closing member; said closing member having at least one window therethrough; and a tongue extending from that edge of said window directed toward said ear end of the closing member to enter said hood opening; whereby pulling said closing member ear toward said band ear will cause said tongue to engage within said hood to pull said band end portion around the band to reduce the internal diameter of the band; said hood having sides joining said band end portion holding said hood from outward bending by said tongue.

4. A hose clamp comprising in combination a flexible band; an outturned ear on the band; said band being circularly curved outwardly and around downwardly from said ear and thence upwardly and around to wrap within itself in overlapping relation to form a closed circle; said band having a longitudinal slot therethrough; a free end portion of said band overlapping said slot from the inner face of the band; a hood on said end portion entering said slot and having a transverse opening thereinto on the end side directed toward said ear; a flexible band closing member curved to fit around the outside of said band; an ear on said band closing member; said closing member having at least one window therethrough; and a tongue extending from that edge of said window directed toward said ear end of the closing member to enter said hood opening; whereby pulling said closing member ear toward said band ear will cause said tongue to engage within said hood to pull said band end portion around the band to reduce the internal diameter of the band; said band end portion having a length extending along said slot beyond said hood and in sliding contact with said band closing member.

5. A hose clamp comprising in combination a flexible band; an outturned ear on the band; said band being circularly curved outwardly and around downwardly from said ear and thence upwardly and around to wrap within itself in overlapping relation to form a closed circle; said band having a longitudinal slot therethrough; a free end portion of said band overlapping said slot from the inner face of the band; a hood on said end portion entering said slot and having a transverse opening thereinto on the end side directed toward said ear; a flexible band closing member curved to fit around the outside of said band; an ear on said band closing member; said closing member having at least one window therethrough; and a tongue extending from that edge of said window directed toward said ear end of the closing member to enter said hood opening; whereby pulling said closing member ear toward said band ear will cause said tongue to engage within said hood to pull said band end portion around the band to reduce the internal diameter of the band; said band end portion having a length extending along said slot beyond said hood and in sliding contact with said band closing member; said band end portion further having flanges extending laterally from said length to lap over onto said band on each side of said slot.

VERNER E. SPROUSE.